United States Patent
Andersen

(10) Patent No.: US 7,111,909 B2
(45) Date of Patent: Sep. 26, 2006

(54) DRUM AND WHEEL CENTERING SLEEVE, KIT AND METHOD

(76) Inventor: James H. Andersen, 1519 Ticonderoga Dr., Fort Collins, CO (US) 80525

( * ) Notice: Subject to any disclaimer, the term of this patent is extended or adjusted under 35 U.S.C. 154(b) by 0 days.

(21) Appl. No.: 10/905,819

(22) Filed: Jan. 21, 2005

(65) Prior Publication Data

US 2006/0163937 A1    Jul. 27, 2006

(51) Int. Cl.
   *B60B 25/00*    (2006.01)
   *B25B 27/14*    (2006.01)
(52) U.S. Cl. .......................... 301/35.627; 301/35.632; 29/273
(58) Field of Classification Search .......... 301/35.627, 301/35.629, 35.631, 35.632, 114; 29/271, 29/273; 411/427; 188/382, 205 A, 206 R, 188/205 R
See application file for complete search history.

(56) References Cited

U.S. PATENT DOCUMENTS

| | | | | |
|---|---|---|---|---|
| 1,889,837 A * | 12/1932 | Michelin | ............... | 301/35.632 |
| 2,352,487 A * | 6/1944 | McNamara, Jr. | ............. | 301/9.1 |
| 2,877,054 A * | 3/1959 | Hedlund et al. | ....... | 301/35.625 |
| 3,049,379 A * | 8/1962 | Hibbard | ...................... | 301/6.1 |
| 4,165,904 A * | 8/1979 | Reppert | ................. | 301/35.631 |
| 4,473,258 A * | 9/1984 | Fox | ............. | 301/36.1 |
| 4,708,397 A * | 11/1987 | Weinmann | ............. | 301/35.632 |
| 4,718,732 A * | 1/1988 | Osborne | .................... | 301/36.1 |
| 4,847,971 A * | 7/1989 | Gevas | ......................... | 29/273 |
| 5,401,079 A * | 3/1995 | Rooney | ..................... | 301/6.91 |
| 5,716,105 A * | 2/1998 | Seifert | .................... | 301/35.627 |
| 5,897,171 A * | 4/1999 | Seifert | .................... | 301/35.627 |
| 6,591,469 B1 * | 7/2003 | Morin | ..................... | 29/402.08 |

* cited by examiner

*Primary Examiner*—Jason R. Bellinger
(74) *Attorney, Agent, or Firm*—Ancel W. Lewis, Jr.

(57) ABSTRACT

A drum and wheel-centering sleeve disclosed for vehicle drum and wheels having apertures of uniform diameter is a set of three that are threaded on three circumferentially spaced hub bolts on which a wheel drum is mounted to center the wheel drum. The sleeve has a hollow sleeve body with a drum-centering portion with a first exterior surface of uniform diameter and a wheel-centering portion with a second exterior surface of uniform diameter the wheel centering portion being of a smaller diameter than the drum centering portion. A set of three sleeves are threaded on bolts at twelve, four and eight o'clock positions with drum centering portion in associated drum apertures to center the drum on the hub. The wheel is mounted with wheel apertures on the wheel-centering portions of the three centering sleeves to center the wheel on the hub.

13 Claims, 2 Drawing Sheets

DRUM AND WHEEL CENTERING SLEEVE, KIT AND METHOD

The present invention relates to mounting vehicle wheels on hubs and more particularly to a device, kit and method for centering a drum and wheel, particularly a truck drum and wheel, on a hub.

BACKGROUND ART

In the past, vehicle wheels have typically incorporated a taper or bevel on each wheel aperture and a complementary taper on the wheel nut to center the wheel on the hub when the wheel is mounted. Presently there are truck wheels such as the 22.5 and 24.5 UNI-Mount truck wheels that have wheel apertures of uniform diameter and use flanged nuts with no taper. This construction does not ensure the wheel is centered on the hub during mounting. If the wheel is not centered on the hub, the wheel is usually unbalanced and results in unnecessary tire wear.

SUMMARY OF THE INVENTION

The drum and wheel centering sleeve disclosed is used as a set of three per wheel that are threaded on three hub bolts to center both the drum and the wheel on the hub. The centering sleeve has a sleeve body, preferably cylindrical, with the drum centering portion and a wheel centering portion. The drum centering portion has a first exterior surface of uniform diameter sized to be slid into and substantially fill a drum aperture when the drum is mounted on the hub. The sleeve body has with an open first end and an open second end opposite and spaced from the first end. The wheel centering portion is in axial alignment with the drum centering portion and has a second exterior surface of uniform diameter and preferably smaller than the diameter of the drum centering portion to slide in a wheel aperture and substantially fill the wheel aperture when a wheel is mounted on the hub. The sleeve body has a tool engaging portion shown as a slot in the second end of the sleeve body that is engaged by a wrench or tool for rotating the sleeve body to thread and un-thread the sleeve body on a hub bolt. In use, with the drum on the hub, three centering sleeve bodies are threaded on three bolts, preferably at 0, 108 and 242 degree intervals starting at a zero degree or twelve o'clock position and rotating clockwise and tightened. The wheel with circumferentially spaced wheel apertures is mounted on the hub with the wheel centering portions substantially filling the associated wheel apertures to center the wheel on the hub.

DETAILED DESCRIPTION OF THE DRAWINGS

Figure 1:
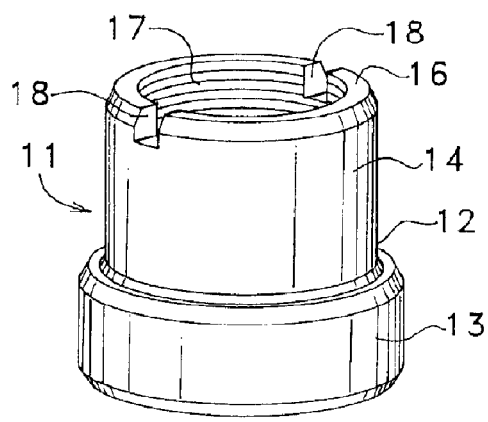
FIG. 1 is a perspective view of a drum and wheel centering sleeve embodying features of the present invention.
Figure 2:
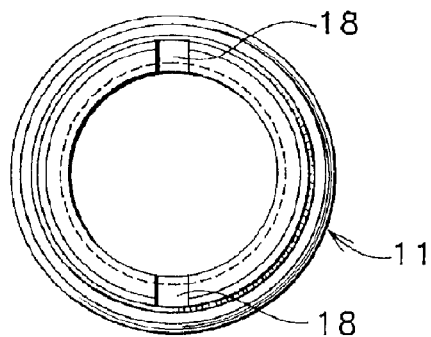
FIG. 2 is a top view of FIG. 1.
Figure 3:
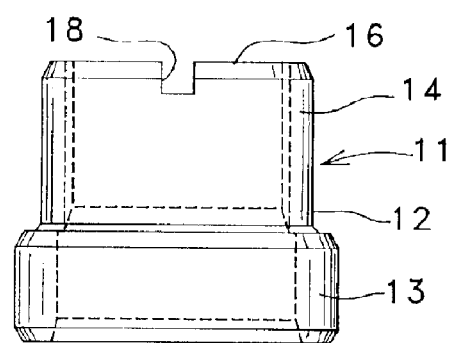
FIG. 3 is a side elevation view of FIG. 1.

Referring now to FIGS. 1–3, there is shown a drum and wheel centering sleeve 11 embodying features of the present invention. Each drum and wheel centering sleeve 11 has a sleeve body 12 of cylindrical shape, a drum centering portion 13 with a cylindrical, smooth exterior surface of uniform diameter and a wheel centering portion 14 with a cylindrical, smooth exterior surface of uniform diameter that axially spaced from the drum centering portion 13 and is shown as having a smaller diameter. The sleeve body 12 terminates in an open first end 15 and an open second end 16 opposite the first end 15. The sleeve body 12 has internal threads 17. The sleeve body has a slot 18 in the second end 16 that is engaged by a tool or wrench for rotating the sleeve to thread and un-thread the sleeve. The sleeve body 12 preferably is made as a one piece construction formed from metal such as mild steel that is zinc plated for wear. The centering sleeves 11 are preferably provided as a set of three per vehicle wheel as shown in FIG. 4.

Figure 4:
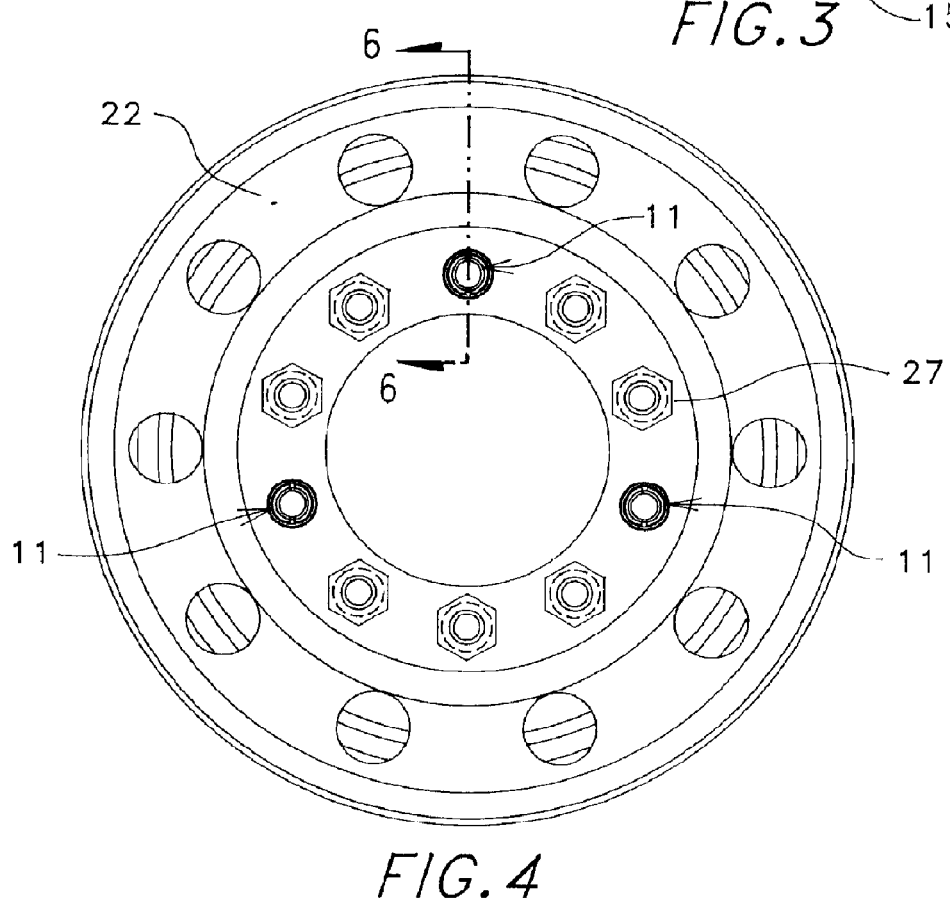
FIG. 4 is a front elevation view of a wheel mounted on a hub with three centering sleeves of FIG. 1, centering the drum and wheel on the hub and with wheel nuts on the remaining bolts.
Figure 6:
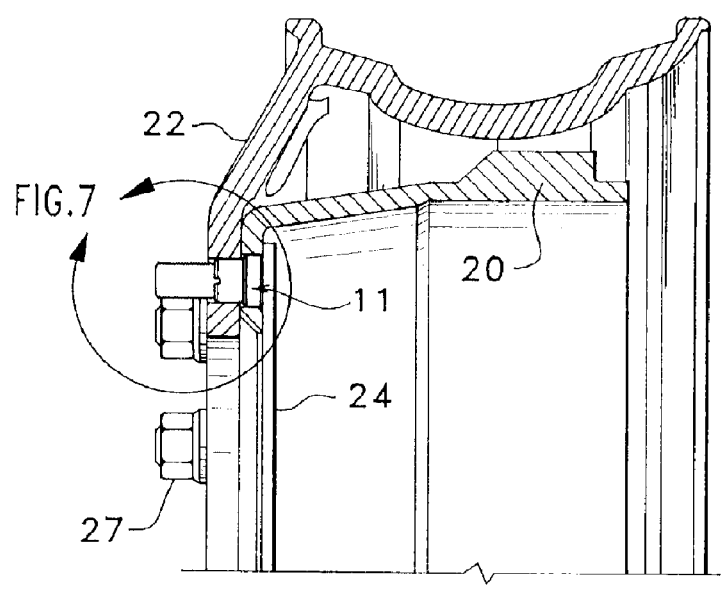
FIG. 6 is a sectional view taken along line 6—6 of FIG. 4.
Figure 7:
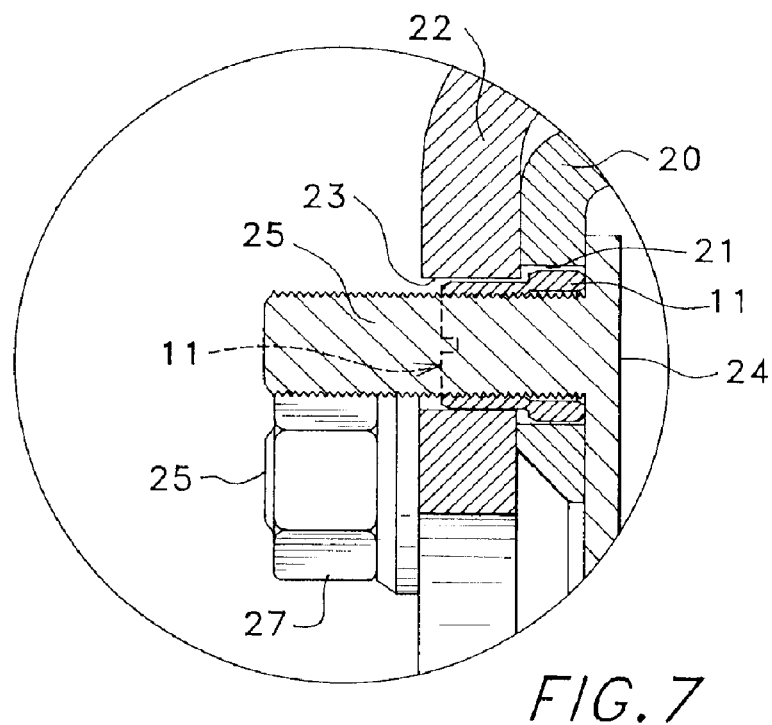
FIG. 7 is an enlarged view of a portion of FIG. 6.

Referring now to FIGS. 4, 6 and 7, there is shown a drum 20 and wheel 22 of the UNI-Mount type without the tire. The drum 20 has ten circumferentially spaced drum apertures 21 and ten circumferentially spaced wheel apertures 23 both at 36 degree intervals. The drum 20 and wheel 22 are shown mounted on a hub 24 having ten circumferentially spaced, studs or bolts 25 each of which extends through an associated drum aperture 21 and wheel aperture 23 when the drum 20 and wheel 22 are mounted on the hub 24 as shown. Seven flanged wheel nuts 27 are shown threaded on seven of the remaining bolts 25. Three identical wheel centering sleeves 11 are shown threaded on three bolts 25 at 0, 108 and 242 degree intervals starting at zero degrees or twelve o'clock position and rotating clockwise and specifically at twelve, four and eight o'clock positions.

A tool or wrench suitable for threading and un-threading the sleeve 11 would comprise of a tube with two projections on the end that are complementary with the slots 18 on the sleeve 11. The tool would be fitted over the bolt and the end projections inserted into the sleeve slots 18 and upon rotation of the tool the sleeve would rotate.

In use, in carrying out the method of the present invention, the vehicle is elevated and the wheel nuts are removed from the hub 14. Three centering sleeves 11 are threaded on three hub bolts at three degree intervals above mentioned and tightened. Seven wheel nuts 27 are installed on the remaining hub bolts and tightened. The centering sleeves 11 remain in place during the operation of the vehicle on which the wheels are mounted. Three wheel nuts 27 are threaded on the three remaining bolts (not shown) and tightened.

From the foregoing, it is apparent the wheel centering sleeves 11 are easily installed. The device has been found effective in providing balanced wheels and thereby minimize wheel vibration and tire wear.

Figure 5:
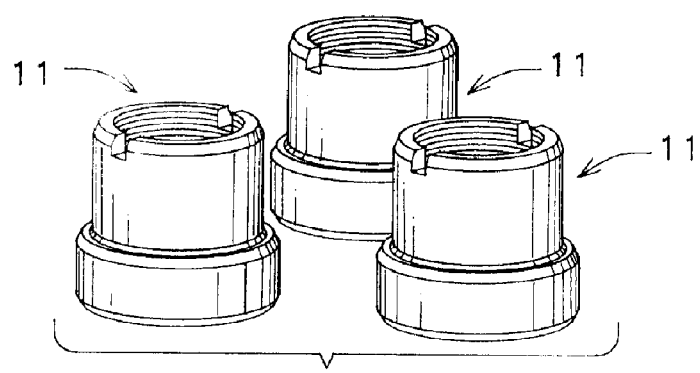
FIG. 5 is a perspective view showing a set of three of the centering drum and wheel sleeves shown in FIG. 1.

A basic kit according to the present invention would be for one wheel and consist of the three sleeves shown in FIG. 5 and installed as above described. A more detailed kit of the above may include two of the sets of three shown in FIG. 5 and a tool for threading the centering sleeves on the bolts.

It is understood that the present invention is applicable to a variety of types of wheels and wheels with a different number of wheel apertures and bolts. For example a wheel with eight wheel apertures and eight bolts or other multiples may be in carrying out the present invention.

Although the present invention has been described with a certain degree of particularity, it is understood that the present disclosure has been made by way of example and that changes in details of structure may be made without departing from the spirit thereof.

What is claimed is:

1. A drum and wheel centering sleeve comprising:
a sleeve body having a drum centering portion sized to slide into a selected one of a plurality of circumferentially spaced drum apertures on a drum when the drum is mounted on a hub having a plurality of circumferentially spaced bolts, said sleeve body having a wheel centering portion, said sleeve body terminating in an open first end and an open second end opposite said first end, said sleeve body having internal threads to enable said sleeve body to be threaded on one of said bolts,
whereby upon the installation of a set of three of said sleeve bodies on associated of said three of said circumferentially spaced bolts by threading said three sleeve bodies on said three bolts with said drum centering portions in said three drum apertures said drum is centered on said hub and upon placement of a wheel with a plurality of circumferentially spaced wheel apertures on said wheel centering portions said wheel is centered on said hub.

2. The sleeve as set forth in claim 1 wherein said sleeve body is of cylindrical shape.

3. The sleeve as set forth in claim 1 wherein said wheel centering portion has a smaller exterior dimension than said drum centering portion.

4. The sleeve as set forth in claim 1 wherein said first and second exterior surfaces of said body are cylindrical and are of uniform diameter.

5. The sleeve as set forth in claim 1 wherein said set of three centering sleeve bodies are installed on disposed at degree intervals of 0, 108 and 242 degrees on said hub starting at a twelve o'clock position and rotating clockwise.

6. The sleeve as set forth in claim 1 wherein said set of three sleeve bodies are at twelve, four and eight o'clock positions.

7. The sleeve as set forth in claim 1 wherein said sleeve body is a one piece metal construction.

8. A drum and wheel centering sleeve comprising:
a sleeve body having a drum centering portion with a first exterior surface of uniform diameter and sized to slide into one of a plurality of circumferentially spaced drum apertures on a drum when the drum is mounted on a hub having a plurality of circumferentially spaced bolts, and a wheel centering portion having a second exterior surface of a uniform diameter, said sleeve body terminating in an open first end and a second end opposite said first end, said exterior surface of said shaft portion is cylindrical and substantially fills said hub aperture and is slidable therein, said sleeve body having internal threads to enable said sleeve body to be threaded on one of said bolts, and
a tool engageable slot in said second end that is engaged by a tool for rotating said sleeve body to thread and un-thread said sleeve body on one of said bolts, and whereby upon the installation of a set of three of said sleeve bodies selected on associated of said three circumferentially spaced bolts by threading said three sleeve bodies on said three associated bolts and tightening said three sleeves said drum is centered on said hub and upon placement of a wheel with a plurality of circumferentially spaced wheel apertures on said wheel centering portions said wheel is centered on said hub.

9. The sleeve as set forth in claim 8 wherein said first exterior surface is complementary to and substantially fills said drum aperture in which said drum centering portion is placed.

10. The sleeve as set forth in claim 1 wherein said second exterior surface is complementary to and substantially fills said wheel aperture in which said drum centering portion is placed.

11. A drum and wheel centering kit comprising:
a set of three identical centering sleeves that are installed on and remain on a selected of a plurality of circumferentially spaced threaded bolts on a hub for a drum having a plurality of circumferentially spaced drum apertures of uniform diameter and a wheel having a plurality of circumferentially spaced wheel apertures of uniform diameter, each said sleeve having:
a sleeve body having a drum centering portion sized to slide into a selected one of said drum apertures when the drum is mounted said hub, said sleeve body having a wheel centering portion, said sleeve body terminating in an open first end and an open second end opposite said first end, said sleeve body having internal threads to enable said sleeve body to be threaded on one of said bolts,
whereby upon the installation of a set of three of said sleeve bodies on associated of said three of said circumferentially spaced bolts by threading said three sleeve bodies on said three bolts with said drum centering portions in said three drum apertures said drum is centered on said hub and upon placement of a wheel with a plurality of circumferentially spaced wheel apertures on said wheel centering portions said wheel is centered on said hub.

12. A method of centering a drum having circumferentially spaced drum apertures and a wheel having circumferentially spaced wheel apertures on a hub having circumferentially spaced bolts comprising the steps of:
mounting a drum on said hub with said bolts in associated of said three drum apertures to center said drum,
mounting a wheel on said hub with three wheel centering portions in associated three wheel apertures on the wheel centering portions to center said wheel,
threading nuts on said bolts to tighten said drum and wheel to said hub,
threading three centering sleeves each with a drum centering portion and a wheel centering portion on three associated bolt so that the associated drum centering portions act in associating drum apertures.

13. The method as set forth in claim 12 wherein said three centering sleeves are mounted at degree intervals of 0, 108 and 242 degrees starting at a twelve o'clock position and rotating clockwise.

* * * * *

UNITED STATES PATENT AND TRADEMARK OFFICE
CERTIFICATE OF CORRECTION

PATENT NO. : 7,111,909 B2
APPLICATION NO. : 10/905819
DATED : September 26, 2006
INVENTOR(S) : James H. Andersen It is certified that error appears in the above-identified patent and that said Letters Patent is hereby corrected as shown below:

Column 1, Line 45, change "242" to -- 252 --

Column 2, Line 30, change "242" to -- 252 --

Column 3, Claim 5, Line 32, change "242" to -- 252 --

Column 4, Claim 13, Line 56, change "242" to -- 252 --

Signed and Sealed this

Tenth Day of March, 2009

JOHN DOLL
*Acting Director of the United States Patent and Trademark Office*